(12) United States Patent
Won et al.

(10) Patent No.: US 10,269,261 B2
(45) Date of Patent: Apr. 23, 2019

(54) FLIGHT SIMULATION DEVICE

(71) Applicant: NAVIWORKS CO., LTD., Seoul (KR)

(72) Inventors: Jun Hee Won, Seoul (KR); Kyong Ju Min, Seoul (KR); Yong Taek Lee, Incheon (KR); Sang Haeng Lee, Gyeonggi-do (KR)

(73) Assignee: Naviworks Co., Ltd., Seoul (KR)

( * ) Notice: Subject to any disclaimer, the term of this patent is extended or adjusted under 35 U.S.C. 154(b) by 229 days.

(21) Appl. No.: 14/916,924

(22) PCT Filed: May 13, 2015

(86) PCT No.: PCT/KR2015/004802
§ 371 (c)(1),
(2) Date: Mar. 4, 2016

(87) PCT Pub. No.: WO2015/182903
PCT Pub. Date: Dec. 3, 2015

(65) Prior Publication Data
US 2017/0076624 A1 Mar. 16, 2017

(30) Foreign Application Priority Data
May 27, 2014 (KR) .................. 10-2014-0063557

(51) Int. Cl.
*G09B 9/08* (2006.01)
*G09B 9/10* (2006.01)
*G09B 9/46* (2006.01)

(52) U.S. Cl.
CPC .................. *G09B 9/10* (2013.01); *G09B 9/08* (2013.01); *G09B 9/46* (2013.01)

(58) Field of Classification Search
USPC ....................... 434/29, 30, 37, 54, 55, 61, 62
See application file for complete search history.

(56) References Cited

U.S. PATENT DOCUMENTS

| 3,542,934 | A | * | 11/1970 | Frizell | G09B 9/063 434/29 |
| 5,669,773 | A | * | 9/1997 | Gluck | A63G 31/16 434/29 |
| 5,853,330 | A | * | 12/1998 | Engstrand | A63J 5/00 472/60 |

(Continued)

FOREIGN PATENT DOCUMENTS

| JP | 4770835 B2 | 9/2011 |
| KR | 101521987 B1 | 5/2015 |

OTHER PUBLICATIONS

Naviworks, Co. Ltd., PCT/KR2015/004802, "International Search Report", dated Aug. 10, 2015.

*Primary Examiner* — Kurt Fernstrom
(74) *Attorney, Agent, or Firm* — McKee, Voohees & Sease, PLC

(57) ABSTRACT

Disclosed is a flight simulation apparatus. According to the flight simulation apparatus of the present disclosure, first left and right rails and second left and right rails slide along a pair of first front and rear rails and a pair of second front and rear rails so that first and second seats can freely move forward and rearward, first and second auxiliary rails are formed to position the first and second seats at various locations in the front-rear direction, and the first and second seats can be stably supported by first and second sliders.

8 Claims, 8 Drawing Sheets

(56) References Cited

U.S. PATENT DOCUMENTS

| | | | | |
|---|---|---|---|---|
| 5,997,303 A | * | 12/1999 | Yoshida | G09B 9/04 434/61 |
| 6,053,576 A | * | 4/2000 | Jessee | A63G 31/16 297/232 |
| 6,077,078 A | * | 6/2000 | Alet | F16M 11/046 434/29 |
| 8,444,496 B2 | * | 5/2013 | Lai | A63G 7/00 472/130 |
| 8,721,464 B2 | * | 5/2014 | Ou Yang | A63G 31/16 434/55 |
| 10,056,007 B2 | * | 8/2018 | Kirkman | G09B 9/04 |
| 2011/0207090 A1 | * | 8/2011 | Margreiter | G09B 9/12 434/37 |
| 2015/0099970 A1 | * | 4/2015 | Schluesselberger Sen. | B25J 17/0208 600/437 |

* cited by examiner

[Fig. 1]
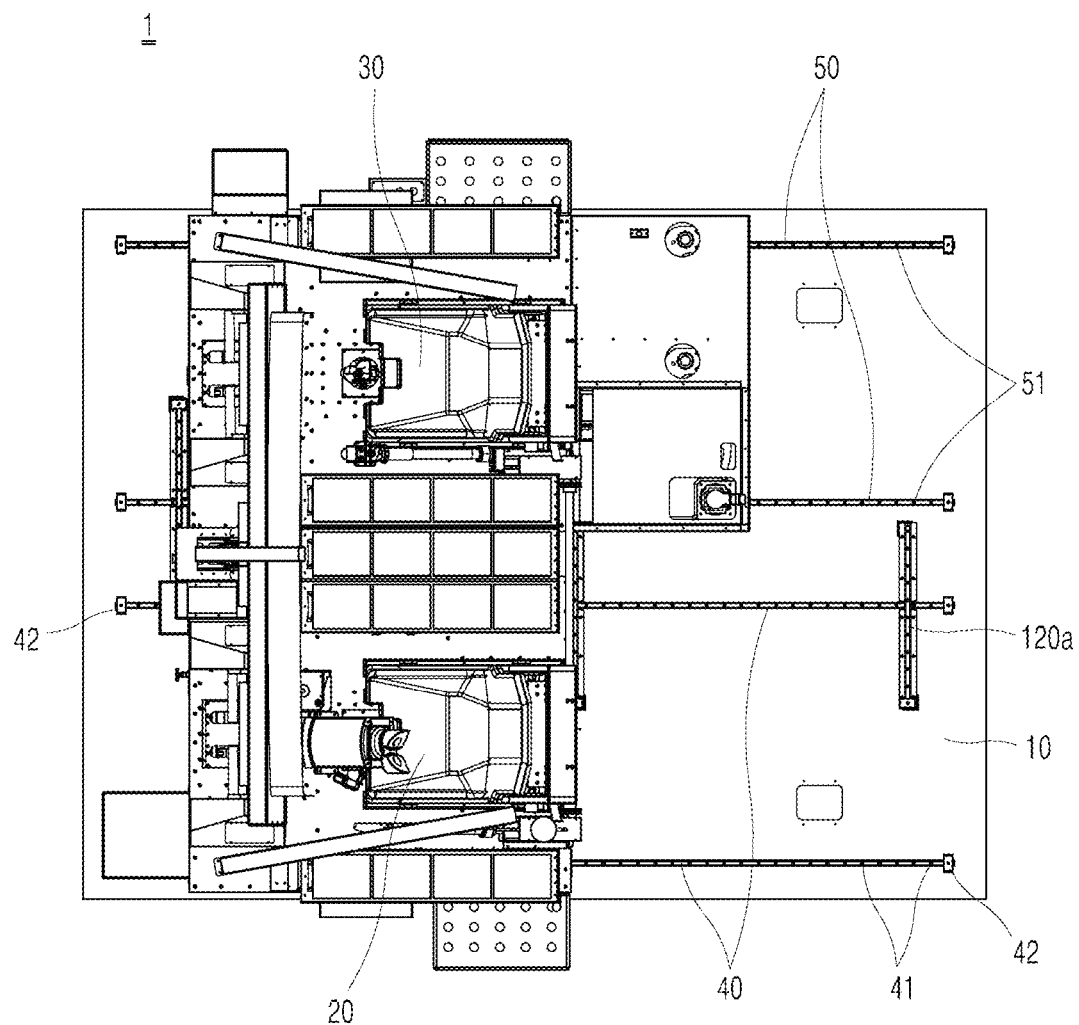

[Fig. 2]
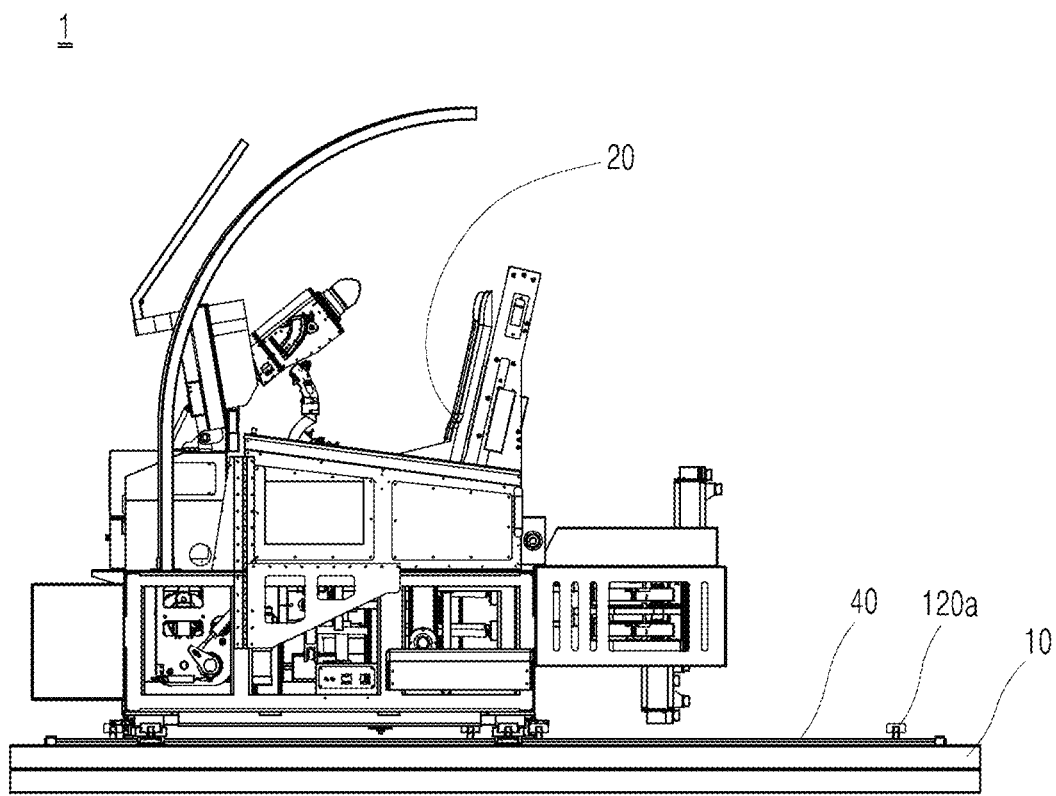

[Fig. 3]
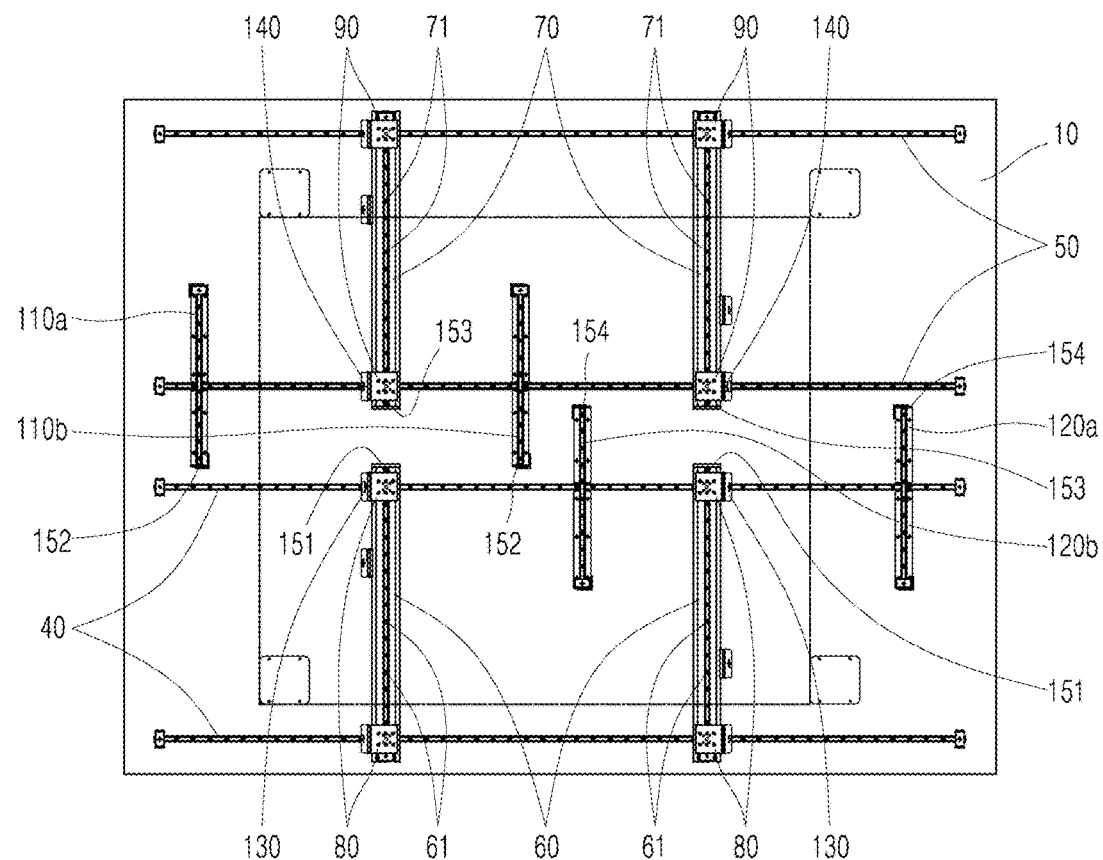

[Fig. 4]
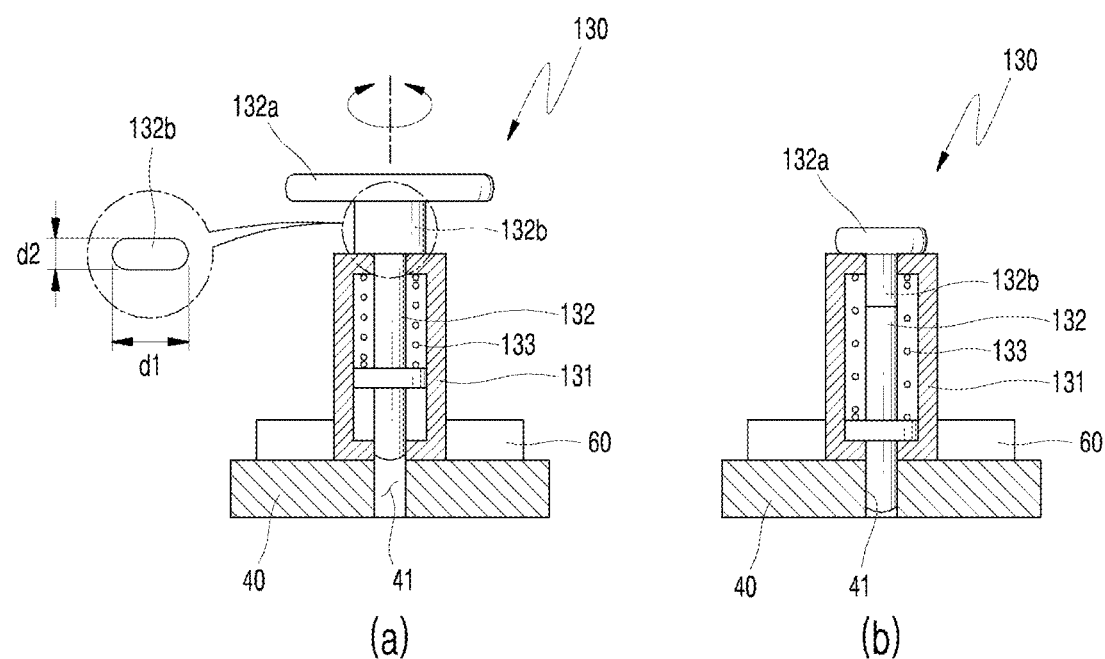

[Fig. 5]
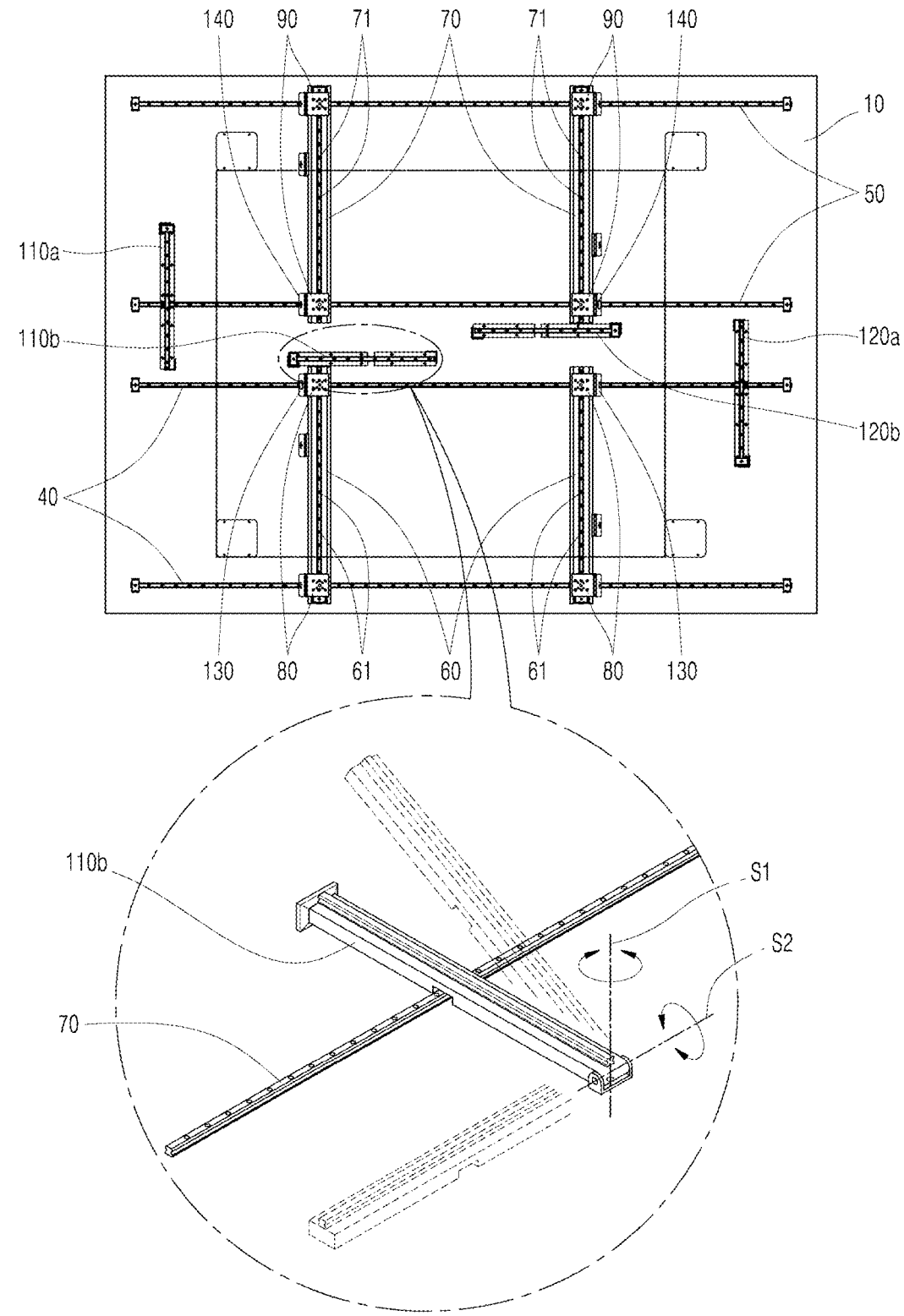

[Fig. 6]
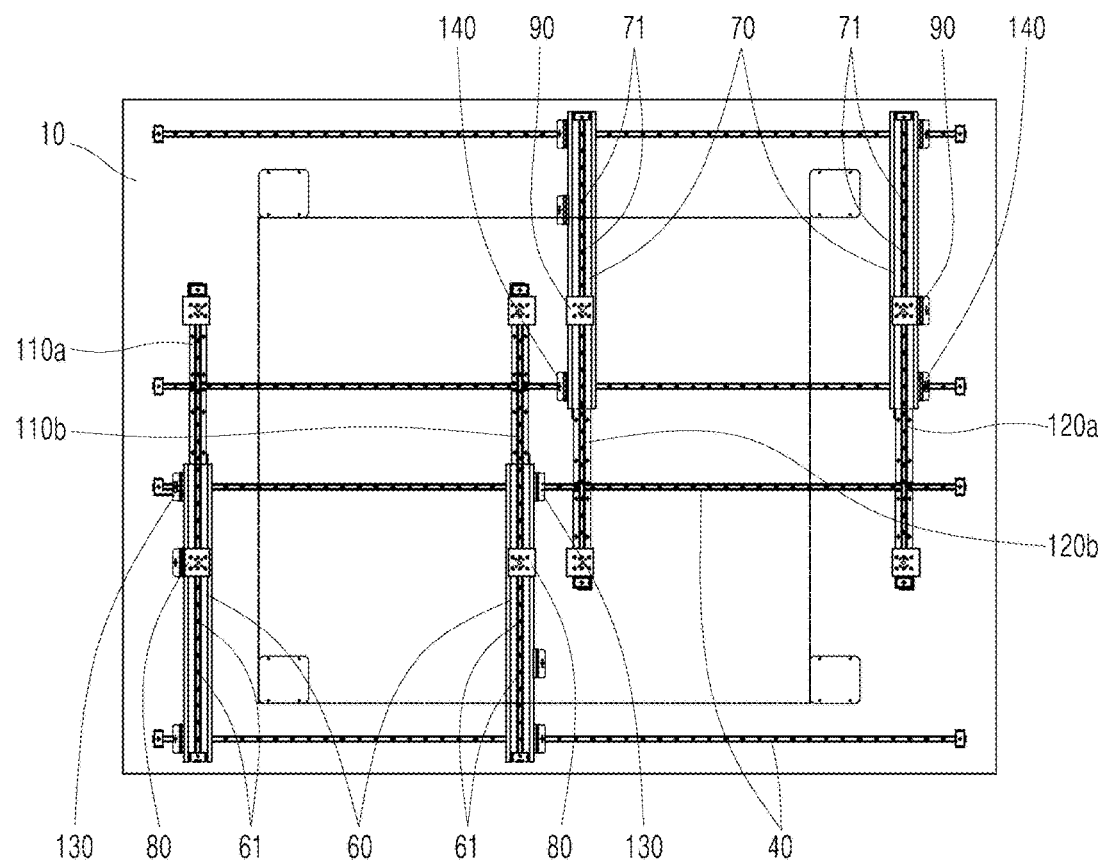

[Fig. 7]
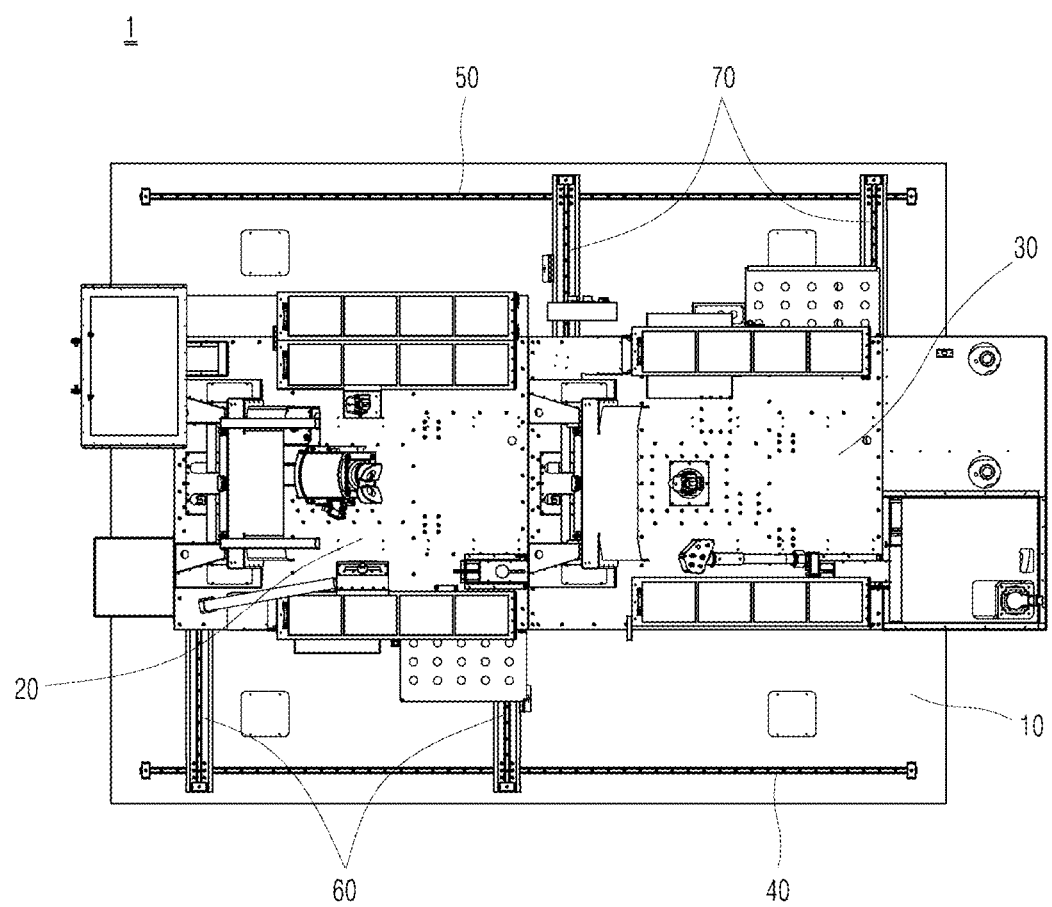

[Fig. 8]
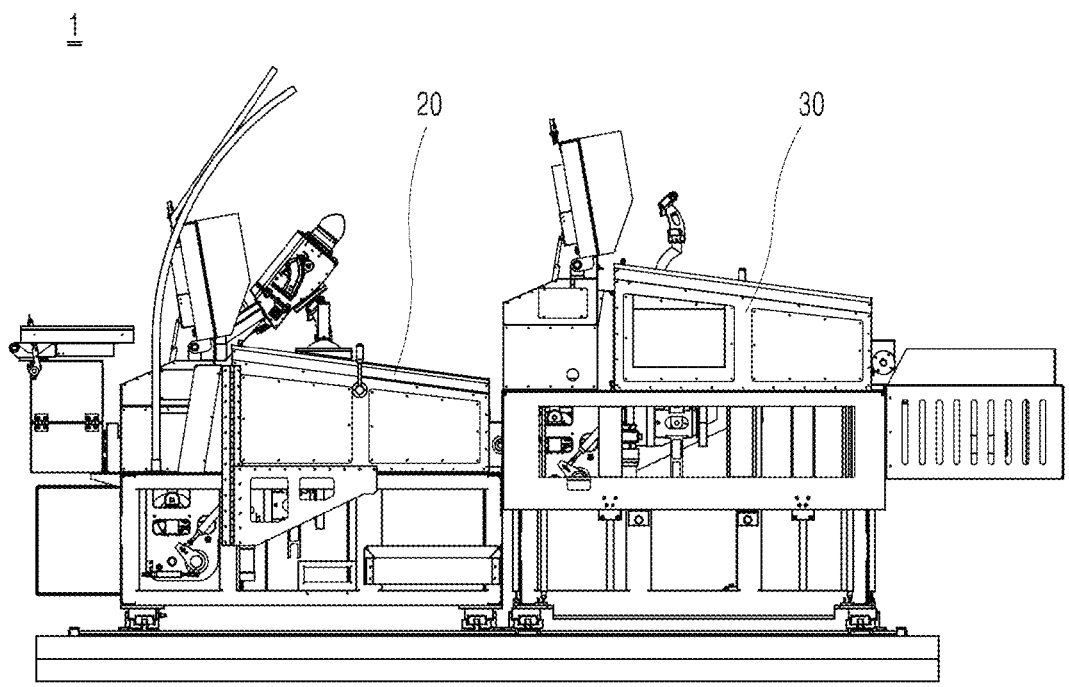

FLIGHT SIMULATION DEVICE

BACKGROUND OF THE DISCLOSURE

1. Field of the Disclosure

The present disclosure relates to a flight simulation apparatus and, more specifically, to a flight simulation apparatus in which various forms of flight simulation training can be carried out by changing the arrangement of pilot seats.

2. Description of the Prior Art

Flight simulation is aimed at pilot training, boarding experiences, or the like for aircraft, such as airplanes, fighter planes, helicopters, etc., and is configured to simulate virtual flight conditions. Equipment or computer software made for that purpose is called a flight simulator.

Flight simulators need to provide a sense of reality similar to a cockpit in order to maximize effects of training. To this end, flight simulators are manufactured in similar shapes to cockpits according to the types of aircraft and have various types of mission equipment, instruments, and air-borne equipment that are mounted thereon.

Examples of equipment for which flight training is required in our military include UH-1H that is a mobile helicopter aimed at supporting troop and material transports, UH-60 (Black Hawk) that is a multi-purpose helicopter with a twin turbine engine and a single engine rotor (propeller) and may be used in various military operations, including tactical transport of infantry, electronic warfare, or as an ambulance helicopter, Bo-105 that is an attack and reconnaissance helicopter with a light twin engine that has been developed by Bolkow in Stuttgart, Germany, CH-47 (Chinook) that is a representative mobile helicopter that is famous for having an unusual shape in which two main rotors are arranged in front and back and is operated for the airlifting of troops and materials, 500MD that is a light attack helicopter developed by Hughes in U.S.A., AH-1S (Cobra) that is a main attack helicopter of the Army, and the like.

For flight simulations of various types of helicopters, simulators may be manufactured and used according to the types of helicopters. However, in this case, manufacturing costs for the simulators increase, and additional equipment for operating the simulators are increased and occupy much space. Therefore, a device is required to make it possible to carry out pilot training for various types of helicopters through a single simulator.

In order to implement various types of helicopters, it is necessary to change instruments and air-borne equipment according to the types of helicopters, and it is required to change the arrangement of pilot seats. For example, UH-1H has pilot seats that are arranged in a left-right direction, whereas AH-1S has pilot seats that are arranged in a front-rear direction. Accordingly, in order to carry out pilot training for UH-1H and AH-1S through a single simulator, the arrangement of pilot seats has to be effectively changed.

Although an attempt is made to change the arrangement of pilot seats in a flight simulator in the related art, the range of motion of an apparatus for implementing that is so limited that the apparatus is not suitable for pilot training for various types of helicopters, and it is difficult to stably support the pilot seats so that effective pilot training cannot be expected. Particularly, these days, flight simulators are made to apply shock and vibration for realistic training according to conditions when the flight simulators are used. However, the unstable support of variable pilot seats may interrupt the training or may make it impossible.

SUMMARY OF THE DISCLOSURE

An aspect of the present disclosure is to provide a flight simulation apparatus that can maximize an available range in the arrangement of pilot seats in the left-right direction and in the front-rear direction, can facilitate changing of the locations of the pilot seats, and can stably support the pilot seats when the locations of the pilot seats are changed.

In accordance with one aspect of the present disclosure, a flight simulation apparatus in which first and second seats, in which a user is able to sit, are arranged in a left-right direction and in a front-rear direction, includes: a base plate; a pair of first front and rear rails formed on the base plate so as to be parallel to each other; a pair of second front and rear rails that are formed on the base plate so as to be parallel to each other and are parallel to the first front and rear rails; a first left and right rail configured to extend in the perpendicular direction to the first front and rear rails and coupled to the pair of first front and rear rails so as to slide thereon along the longitudinal direction of the first front and rear rails; a second left and right rail configured to extend in the perpendicular direction to the second front and rear rails and coupled to the pair of second front and rear rails so as to slide thereon along the longitudinal direction of the second front and rear rails; at least two first sliders coupled to the first left and right rail so as to slide thereon along the longitudinal direction of the first left and right rail and configured to support the first seat; at least two second sliders coupled to the second left and right rail so as to slide thereon along the longitudinal direction of the second left and right rail and configured to support the second seat; a first auxiliary rail that is parallel to the first left and right rail, is configured to cross the second front and rear rails, and is formed such that the first sliders are to slide thereon; and a second auxiliary rail that is parallel to the second left and right rail, is configured to cross the first front and rear rails, and is formed such that the second sliders are to slide thereon.

Further, a pair of first sliders may be located on the upper sides of the pair of first front and rear rails, and a pair of second sliders may be located on the upper sides of the pair of second front and rear rails.

Further, first insertion holes may be repeatedly formed in the first front and rear rails along the longitudinal direction thereof, second insertion holes may be repeatedly formed in the second front and rear rails along the longitudinal direction thereof, and the flight simulation apparatus may further include: first block units that are coupled to the first left and right rails and are inserted into, or extracted from, the first insertion holes to prevent the first left and right rails from moving; and second block units that are coupled to the second left and right rails and are inserted into, or extracted from, the second insertion holes to prevent the second left and right rails from moving.

Further, each of the first block units may include: a housing fixedly coupled to the first left and right rail; an insert that is configured to move upward and downward through the housing and has the lower end portion inserted into the first insertion hole; and a resilient object configured to resiliently support the insert in the direction in which the insert is inserted into the first insertion hole, wherein the insert may have a stopper formed thereon and may be maintained to be extracted from the first insertion hole when the insert is rotated while being pulled in the opposite direction to the first insert hole.

Further, third insertion holes may be repeatedly formed in the first left and right rails along the longitudinal direction thereof, fourth insertion holes may be repeatedly formed in the second left and right rails along the longitudinal direction thereof, each of the first sliders may be coupled with a third block unit that is inserted into the third insertion hole to prevent the first slider from moving, and each of the second sliders may be coupled with a fourth block unit that is inserted into the fourth insertion hole to prevent the second slider from moving.

In the flight simulation apparatus according to the present disclosure, a pair of first left and right rails, a pair of second left and right rails, a pair of first auxiliary rails, and a pair of second auxiliary rails may be provided, the interval between the pair of first left and right rails may be the same as that between the pair of first auxiliary rails, and the interval between the pair of second left and right rails may be the same as that between the pair of second auxiliary rails.

Here, the first and second auxiliary rails may be detachably coupled to the base plate.

Meanwhile, the first auxiliary rail and the second auxiliary rail that are located on the inner side of the base plate among the pair of first auxiliary rails and the pair of second auxiliary rails may be rotatably coupled to the base plate, and each of the rotation axes of the first and second auxiliary rails may include a vertical rotation axis and a horizontal rotation axis.

In this case, the first and second auxiliary rails may be configured to rotate about the rotation axes and may be located between the first and second front and rear rails so as to be parallel thereto without interference.

In the flight simulation apparatus according to the present disclosure, an attractive force may be applied between end portions of the first left and right rails and end portions of the first auxiliary rails that face each other in order to make the first left and right rails and the first auxiliary rails aligned with each other, and an attractive force may be applied between end portions of the second left and right rails and end portions of the second auxiliary rails that face each other in order to make the second left and right rails and the second auxiliary rails aligned with each other.

Further, permanent magnets may be formed on one or more of the end portions of the first left and right rails and the end portions of the first auxiliary rails that face each other, and permanent magnets may be formed on one or more of the end portions of the second left and right rails and the end portions of the second auxiliary rails that face each other.

According to the present disclosure, the first left and right rails and the second left and right rails slide along the pair of first front and rear rails and the pair of second front and rear rails so that the first and second seats can freely move forward and rearward, the first and second auxiliary rails are formed to position the first and second seats at various locations in the front-rear direction so that pilot training for various types of aircraft can be easily carried out, and the first and second seats can be stably supported by the first and second sliders even though the locations of the first and second seats are changed.

Further, the pair of first sliders and the pair of the second sliders are located above the first front and rear rails and the second front and rear rails, respectively, so that the loads acting on the first and second seats can be transmitted to the first front and rear rails and the second front and rear rails without being excessively applied to the first left and right rails and the second left and right rails, thereby forming a flight simulation apparatus with a stable structure.

Further, the first and second block units, which are inserted into the first and second insertion holes, are formed to easily fix the first and second seats when the locations of the first and second seats are adjusted in the front-rear direction, and in particular, each of the first block units includes a housing, an insert, and a resilient object so that fixing and separating can be rapidly performed.

Further, the pair of first auxiliary rails and the pair of second auxiliary rails are provided, the first auxiliary rail and the second auxiliary rail that are located on the inner side of the base plate are rotatably coupled to the base plate, and the rotation axes of the first and second auxiliary rails include a vertical rotation axis and a horizontal rotation axis, thereby preventing the first and second auxiliary rails from interfering with the first and second front and rear rails, and easily and rapidly arranging the first and second seats in the left-right direction.

Further, permanent magnets are formed on the end portions of the first left and right rails and the first auxiliary rails that face each other and on the end portions of the second left and right rails and the second auxiliary rails that face each other so that attractive forces are applied therebetween, thereby easily and rapidly performing the alignment between the first left and right rails and the first auxiliary rails and the alignment between the second left and right rails and the second auxiliary rails.

BRIEF DESCRIPTION OF THE DRAWINGS

The above and other objects, features, and advantages of the present disclosure will be more apparent from the following detailed description taken in conjunction with the accompanying drawings, in which:

FIG. 1 is a top plan view illustrating a state in which a first seat and a second seat are arranged in a left-right direction in a flight simulation apparatus according to an exemplary embodiment of the present disclosure;

FIG. 2 is a side view of the flight simulation apparatus illustrated in FIG. 1;

FIG. 3 is a top plan view illustrating a state in which the first seat and the second seat are excluded from the flight simulation apparatus illustrated in FIG. 1;

FIGS. 4A and 4B are sectional views of a first block unit of the flight simulation apparatus according to the present disclosure;

FIG. 5 is a top plan view illustrating a state in which first auxiliary rails and second auxiliary rails are moved in the flight simulation apparatus illustrated in FIG. 3;

FIG. 6 is a top plan view illustrating a state in which first left and right rails and second left and right rails are moved in the flight simulation apparatus illustrated in FIG. 3;

FIG. 7 is a top plan view illustrating a state in which the first seat and the second seat are arranged in a front-rear direction in the flight simulation apparatus according to the exemplary embodiment of the present disclosure; and FIG. 8 is a sectional view of the flight simulation apparatus illustrated in FIG. 7.

| * Description of reference numerals * | |
|---|---|
| 1: Flight simulation apparatus | 10: Base plate |
| 20: First seat | 30: Second seat |
| 40: First front and rear rail | 41: First insertion hole |
| 50: Second front and rear rail | 51: Second insertion hole |
| 60: First left and right rail | |
| 70: Second left and right rail | |

-continued

* Description of reference numerals *

| 80: First slider | 90: Second slider |
| 110a, 110b: First auxiliary rail | |
| 120a, 120b: Second auxiliary rail | |
| 130: First block unit | 131: Housing |
| 132: Insert | 132a: Handle |
| 132b: Stopper | 133: Resilient object |
| 140: Second block unit | |
| 151, 152, 153, 154: Permanent magnet | |

DETAILED DESCRIPTION OF THE EXEMPLARY EMBODIMENTS

Hereinafter, exemplary embodiments of the present disclosure will be described in detail with reference to the accompanying drawings. In the description of the present disclosure, the description of the well-known function or structure will be omitted in order to clear the subject matter of the present disclosure.

FIG. 1 is a top plan view illustrating a state in which a first seat 20 and a second seat 30 are arranged in a left-right direction in a flight simulation apparatus 1 according to an exemplary embodiment of the present disclosure. FIG. 2 is a side view of the flight simulation apparatus 1 illustrated in FIG. 1. FIG. 3 is a top plan view illustrating a state in which the first seat 20 and the second seat 30 are excluded from the flight simulation apparatus 1 illustrated in FIG. 1. FIGS. 4A and 4B are sectional views of a first block unit 130 of the flight simulation apparatus 1 according to the present disclosure. FIG. 5 is a top plan view illustrating a state in which first auxiliary rails 110a and 110b and second auxiliary rails 120a and 120b are moved in the flight simulation apparatus 1 illustrated in FIG. 3. FIG. 6 is a top plan view illustrating a state in which first left and right rails 60 and second left and right rails 70 are moved in the flight simulation apparatus 1 illustrated in FIG. 3. FIG. 7 is a top plan view illustrating a state in which the first seat 20 and the second seat 30 are arranged in a front-rear direction in the flight simulation apparatus 1 according to the exemplary embodiment of the present disclosure. FIG. 8 is a sectional view of the flight simulation apparatus 1 illustrated in FIG. 7.

The flight simulation apparatus 1, according to the present disclosure, relates to an apparatus for carrying out pilot training for aircraft, such as airplanes, fighter planes, helicopters, etc. and, more specifically, to a flight simulation apparatus 1 in which the arrangement of pilot seats for a helicopter, etc. can be changed.

In the present disclosure, the first seat 20 and the second seat 30 constitute the pilot seats, and the present disclosure includes at least two pilot seats.

In the following description of the flight simulation apparatus 1, according to the present disclosure, the left side is referred to as the front side, and the right side is referred to as the rear side based on the state illustrated in FIG. 1 (the lower side is referred to as the left side, and the upper side is referred to as the right side).

The first and second seats 20, 30, which constitute pilot seats in the flight simulation apparatus 1 according to the present disclosure, may be arranged in the left-right direction, and the state is illustrated in FIG. 1. Further, the first and second seats 20, 30 may also be arranged in the front-rear direction, and the state is illustrated in FIG. 7.

Each of the first and second seats 20, 30 is configured such that a user carrying out simulation training may sit therein, and basically has a shape of a seat. The first and second seats 20, 30 may have a shape of a seat in themselves, or may have a shape of a plate that includes a seat (for example, a shape in which a seat is mounted on a plate).

The first and second seats 20, 30 slide relative to a base plate 10, which will be described below, in the front-rear direction and in the left-right direction.

The flight simulation apparatus, according to the present disclosure, includes the base plate 10, first front and rear rails 40, second front and rear rails 50, the first left and right rails 60, the second left and right rails 70, first sliders 80, second sliders 90, the first auxiliary rails 110a and 110b, and the second auxiliary rails 120a and 120b.

The base plate 10 forms the foundation of the flight simulation apparatus 1 according to the present disclosure, and other elements may be coupled to the base plate 10, or may be configured to move on the base plate 10. The base plate 10 has a shape of a flat plate on the whole.

The first front and rear rails 40 support the first left and right rails 60 such that the first left and right rails 60 may slide thereon. Accordingly, the first front and rear rails 40 extend in the front-rear direction and have a uniform cross-section along the longitudinal direction (particularly, the cross section of the upper portion thereof is uniform). The first front and rear rails 40 may be formed in a recessed shape on the upper surface of the base plate 10, but may be preferably formed to protrude from the upper surface of the base plate 10. For example, the first front and rear rails 40 may have a cross section in the shape of .

A pair of first front and rear rails 40 are spaced apart from each other to be parallel to each other.

The first front and rear rails 40 have first insertion holes 41 that are repeatedly formed therein at a predetermined interval along the longitudinal direction. The first insertion holes 41 may have a shape of a recess that is concavely formed on the upper surfaces of the first front and rear rails 40, or may have a shape of a through-hole that is vertically formed through the first front and rear rails 40.

Further, each of the first front and rear rails 40 has stoppers 42 formed on opposite end portions thereof for restricting the movement of the first left and right rails 60, and the same type of stoppers 42 are also provided on the second front and rear rails 50, the first left and right rails 60, the second left and right rails 70, the first auxiliary rails 110a and 110b, and the second auxiliary rails 120a and 120b.

The second front and rear rails 50 support the second left and right rails 70 such that the second left and right rails 70 may slide thereon. Accordingly, the second front and rear rails 50 extend in the front-rear direction and have a uniform cross-section. The second front and rear rails 50 may also be formed in a recessed shape on the upper surface of the base plate 10. However, the second front and rear rails 50 may be preferably formed to protrude from the upper surface of the base plate 10, and in particular, have the same shape as the first front and rear rails 40.

A pair of second front and rear rails 50 are provided to be parallel to each other, and are arranged to be parallel to the first front and rear rails 40. The second front and rear rails 50 have the same length as the first front and rear rails 40 and are located on the base plate 10 so as to be bilaterally symmetric thereto.

Likewise to the first insertion holes 41 formed in the first front and rear rails 40, second insertion holes 51 are repeatedly formed in the second front and rear rails 50.

The interval between the pair of first front and rear rails 40 is preferably the same as that between the pair of second front and rear rails 50, and the interval between the pair of first front and rear rails 40 (or the pair of the second front and rear rails 50) is preferably larger than the distance between the first front and rear rails 40 and the second front and rear rails 50 in order to stably support the first and second seats 20, 30.

The first left and right rails 60 extend in the perpendicular direction to the first front and rear rails 40 and are coupled to the upper sides of the first front and rear rails 40 so as to slide thereon. The first left and right rails 60 are coupled to the upper sides of the first front and rear rails 40 so as to not move in a direction other than the longitudinal direction of the first front and rear rails 40. Accordingly, the bottom surfaces of the portions of the first left and right rails 60 where the first front and rear rails 40 are coupled are preferably formed to surround the first front and rear rails 40. For example, the first left and right rails 60 have a shape of ⊔ that is downwardly concave.

The first left and right rails 60 are coupled, at opposite end portions thereof, to the pair of first front and rear rails 40.

Although a single first left and right rail 60 may be provided, a pair of first left and right rails 60 are preferably provided to be parallel to each other. Accordingly, the first front and rear rails 40 and the first left and right rails 60 are coupled to each other to form a lattice shape.

The first left and right rails 60 support the first sliders 80 such that the first sliders 80 may slide thereon in the left-right direction. Accordingly, the first left and right rails 60 have the upper portions of which the cross sections are uniform in the left-right direction. Although the upper portions of the first left and right rails 60 may be recessed, the upper portions of the first left and right rails 60 may be formed to protrude from the first left and right rails. For example, the first left and right rails 60 may have a cross section in the shape of ⊓ in the longitudinal direction.

The first left and right rails 60 have third insertion holes 61 that are repeatedly formed at a predetermined interval along the longitudinal direction. The third insertion holes 61 may have a shape of a recess that is concavely formed on the upper surfaces of the first left and right rails 60, or may have a shape of a through-hole that is vertically formed through the first left and right rails 60.

Further, first block units 130 are fixedly coupled to the first left and right rails 60, and parts of the first block units 130 are inserted into, or extracted from, the first insertion holes 41 in order to prevent the first left and right rails 60 from moving relative to the first front and rear rails 40.

Each of the first block units 130 may include a housing 131, an insert 132, and a resilient object 133.

The housing 131 is fixedly coupled to the corresponding first left and right rail 60 and is open at the upper and lower portions thereof.

The insert 132 moves upward and downward through the housing 131, and the lower end portion of the insert 132 is inserted into the first insertion hole 41 corresponding thereto. Namely, the lower end of the insert 132 is inserted into the first insertion hole 41 when the insert 132 moves downward with respect to the housing 131, and is extracted from the first insertion hole 41 when the insert 132 moves upward with respect to the housing 131.

Further, the insert 132 has a stopper 132b formed thereon, and the stopper 132b may be stopped by the upper end of the housing 131, or may be inserted into the upper hole of the housing 131, according to a degree to which the insert 132 rotates. Namely, the stopper 132b of the insert 132 is not formed in a circular shape, but in a shape in which a diameter d1 of one direction is relatively larger than a diameter d2 of the perpendicular direction thereto, wherein the diameter d2 is formed to be small to a degree to which the stopper 132b can be inserted into the upper hole of the housing 131, and the diameter d1 is formed to be large to a degree to which the stopper 132b cannot be inserted into the upper hole of the housing 131.

A handle 132a is formed on the upper side of the stopper 132b of the insert 132, and a user may pull the insert 132 upward, or may rotate the insert 132 in the clockwise or counterclockwise direction, by using the handle 132a.

The resilient object 133 may resiliently support the insert 132 in the direction in which the lower end of the insert 132 is inserted into the first insertion hole 41. The resilient object 133 may have a shape of a coil spring and may be provided in the interior of the housing 131.

The second left and right rails 70 extend in the perpendicular direction to the second front and rear rails 50 and are coupled to the upper sides of the second front and rear rails 50 so as to slide thereon. The second left and right rails 70 are coupled to the upper sides of the second front and rear rails 50 so as to not move in a direction other than the longitudinal direction of the second front and rear rails 50, and the shapes of the lower sides of the second left and right rails 70 are preferably the same as those of the first left and right rails 60.

The second left and right rails 70 are also coupled, at opposite end portions thereof, to the pair of second front and rear rails 50. A pair of second left and right rails 70 are preferably provided to be parallel to each other.

The second left and right rails 70 support the second sliders 90 such that the second sliders 90 may slide thereon in the left-right direction. Accordingly, the second left and right rails 70 have the upper portions of which the cross sections are uniform in the left-right direction. The shapes of the upper portions of the second left and right rails 70 are preferably the same as those of the first left and right rails 60.

The second left and right rails 70 have fourth insertion holes 71 that are repeatedly formed at a predetermined interval along the longitudinal direction. The fourth insertion holes 71 may have a shape of a recess that is concavely formed on the upper surfaces of the second left and right rails 70, or may have a shape of a through-hole that is vertically formed through the second left and right rails 70.

Further, second block units 140 are fixedly coupled to the second left and right rails 70, and parts of the second block units 140 are inserted into, or extracted from, the second insertion holes 51 in order to prevent the second left and right rails 70 from moving relative to the second front and rear rails 50. The second block units 140 may have the same shapes as the first block units 130, which are described above.

The first sliders 80 are coupled to the first left and right rails 60 so as to slide along the longitudinal direction of the first left and right rails 60 (along the left-right direction), and are coupled to the bottom of the first seat 20 to support the first seat 20.

The first sliders 80 are coupled to the upper sides of the first left and right rails 60 so as not to move in a direction other than the longitudinal direction of the first left and right rails 60 (the left-right direction). Accordingly, the bottoms of the first sliders 80 are preferably formed to partially surround the upper portions of the first left and right rails 60. For example, the first sliders 80 have a cross section in the shape of that is downwardly concave.

Although a single first slider 80 may be provided, at least two first sliders 80 are preferably provided. In particular, a pair of first sliders 80 are preferably provided. In this case, the interval between the first sliders 80 is the same as that between the first front and rear rails 40, and the first sliders 80 are located above the first front and rear rails 40 when the first and second seats 20, 30 are arranged in the left-right direction. Accordingly, the load acting on the first seat 20 may be transmitted to the first front and rear rails 40 without being excessively applied to the first left and right rails 60, thereby forming the flight simulation apparatus 1 with a stable structure.

Further, third block units are fixedly coupled to the first sliders 80, and parts of the third block units are inserted into, or extracted from, the third insertion holes 61 in order to prevent the first sliders 80 from moving relative to the first left and right rails 60.

The third block units may have the same shapes as the first block units 130.

The second sliders 90 are coupled to the second left and right rails 70 so as to slide along the longitudinal direction of the second left and right rails 70 (along the left-right direction), and are coupled to the bottom of the second seat 30 to support the second seat 30.

The second sliders 90 have the same shapes as the first sliders 80, and are coupled to the second left and right rails 70 in the same way that the first sliders 80 are coupled to the first left and right rails 60.

Although a single second slider 90 may be provided, at least two second sliders 90 are preferably provided, and in particular, a pair of second sliders 90 are preferably provided. The pair of second sliders 90 are also located above the second front and rear rails 50 when the first and second seats 20, 30 are arranged in the left-right direction.

Further, fourth block units are fixedly coupled to the second sliders 90, and parts of the fourth block units are inserted into, or extracted from, the fourth insertion holes 71 in order to prevent the second sliders 90 from moving relative to the second left and right rails 70.

The fourth block units may have the same shapes as the first block units 130.

The first auxiliary rails 110a and 110b may be secured to the base plate 10, and are arranged to be parallel to the first left and right rails 60 and to cross the second front and rear rails 50. The number of the first auxiliary rails 110a and 110b is the same as that of the first left and right rails 60, and the first auxiliary rails 110a and 110b are parallel to each other.

The first auxiliary rails 110a and 110b support the first sliders 80 such that the first sliders 80 may slide thereon in the left-right direction. Accordingly, the first auxiliary rails 110a and 110b have the upper portions of which the cross sections are uniform in the left-right direction. The upper portions of the first auxiliary rails 110a and 110b have the same shapes (the same cross sections) as those of the first left and right rails 60, and the heights of the first auxiliary rails 110a and 110b are the same as those of the first left and right rails 60 based on the base plate 10.

The first auxiliary rails 110a and 110b are configured such that the first sliders 80 may smoothly slide from the first left and right rails 60 to the first auxiliary rails 110a and 110b. Accordingly, when the first left and right rails 60 moves toward the first auxiliary rails 110a and 110b on the first front and rear rails 40, the end portions of the first auxiliary rails 110a and 110b are brought close to, or closely approach, the end portions of the first left and right rails 60.

The second auxiliary rails 120a and 120b may be secured to the base plate 10, and are arranged to be parallel to the second left and right rails 70 and to cross the first front and rear rails 40. The number of the second auxiliary rails 120a and 120b is the same as that of the second left and right rails 70, and the second auxiliary rails 120a and 120b are parallel to each other.

The second auxiliary rails 120a and 120b preferably have the same shapes and sizes as the first auxiliary rails 110a and 110b.

The first auxiliary rails 110a and 110b may be secured to the front or rear side on the base plate 10. When the second auxiliary rails 120a and 120b are secured to the rear side on the base plate 10, the first auxiliary rails 110a and 110b are secured to the front side on the base plate 10 (the first auxiliary rails 110a and 110b and the second auxiliary rails 120a and 120b have point symmetry with respect to the center of the base plate 10).

Among the first auxiliary rails 110a and 110b, the first auxiliary rail 110b, which is located on the inner side of the base plate 10, is coupled, at one end portion thereof (at the end portion directed toward the first front and rear rails 40), to the base plate 10 so as to be rotatable, and the rotation axis of the first auxiliary rail 110b includes a vertical rotation axis S1 and a horizontal rotation axis S2 (particularly, orienting in the front-rear direction). Namely, the first auxiliary rail 110b can rotate not only about the rotation axis S2 parallel to the first front and rear rails 40 but also about the vertical rotation axis S1 in two dimensions.

The rotatable first auxiliary rail 110b is fixed (rotatably fixed), at the portion thereof in which the rotation axes are formed, to the base plate 10, and may be firmly fixed (unrotatably fixed) to the base plate 10 by using a fixing means, such as a bolt.

As described above, through the two-dimensional rotation of the first auxiliary rail 110b, the first auxiliary rail 110b is placed on the base plate 10 so as to be parallel to the first left and right rails 60, and is easily placed in the direction parallel to the first front and rear rails 40. The former corresponds to a state in which the first auxiliary rail 110b is used (a state in which the first sliders 80 can slide along the first auxiliary rails 110a and 110b), and the latter corresponds to a state in which the first auxiliary rail 110b is not used.

Further, since the first auxiliary rail 110b is located between the first front and rear rails 40 and the second front and rear rails 50 without crossing the second front and rear rails 50 in the latter case, the first auxiliary rail 110b does not interfere with the second left and right rails 70 when the second left and right rails 70 move forward and rearward along the second front and rear rails 50, and the second left and right rails 70 can sufficiently slide. After the movement of the second left and right rails 70 is completed (e.g., after the second left and right rails 70 move to the rear sides of the second front and rear rails 50), the first auxiliary rail 110b may be moved to be parallel to the first left and right rails 60 and may then be used.

Among the second auxiliary rails 120a and 120b, the second auxiliary rail 120b, which is located on the inner side of the base plate 10, is also rotatably coupled to the base plate 10, and the rotation axis of the second auxiliary rail 120b also includes a vertical rotation axis and a horizontal rotation axis (particularly, orienting in the front-rear direction).

The second auxiliary rail 120b rotates in the same way that the first auxiliary rail 110b rotates.

In the flight simulation apparatus 1, according to the present disclosure, as the first left and right rails 60 move along the first front and rear rails 40, the first left and right rails 60 are misaligned with the first auxiliary rails 110a and 110b, or coincide with (are aligned with) the first auxiliary rails 110a and 110b according to the location thereof. The first left and right rails 60 are moved to be aligned with the first auxiliary rails 110a and 110b in order to arrange the first and second seats 20, 30 in the front-rear direction, and in this case, the alignment between the first left and right rails 60 and the first auxiliary rails 110a and 110b has to be rapidly and easily carried out in order to rapidly change the arrangement of the pilot seats.

To this end, in the present disclosure, an attractive force is applied between the end portions of the first left and right rails 60 and the end portions of the first auxiliary rails 110a and 110b that face each other. Specifically, permanent magnets 151 and 152 are fixedly formed on one or more of the end portions of the first left and right rails 60 and the end portions of the first auxiliary rails 110a and 110b. Namely, permanent magnets are fixedly formed on the end portions of the first left and right rails 60 or on the end portions of the first auxiliary rails 110a and 110b, and ferromagnetic metals are provided on the end portions where the permanent magnets are not formed such that an attractive force acts therebetween. Alternatively, the permanent magnets 151 and 152 may be formed on both the end portions of the first left and right rails 60 and the end portions of the first auxiliary rails 110a and 110b such that an attractive force acts therebetween.

As such, when the first left and right rails 60 move along the first front and rear rails 40, the first left and right rails 60 are rapidly positioned through the alignment with the first auxiliary rails 110a and 110b while approaching the first auxiliary rails 110a and 110b even through the locations where the first left and right rails 60 coincide with the first auxiliary rails 110a and 110b are not specially identified.

An attractive force is also applied between the end portions of the second left and right rails 70 and the end portions of the second auxiliary rails 120a and 120b that face each other, and likewise to the first left and right rails 60 and the first auxiliary rails 110a and 110b, permanent magnets 153 and 154 are formed on one or more of the end portions of the second left and right rails 70 and the end portions of the second auxiliary rails 120a and 120b that face each other.

Although the exemplary embodiment of the present disclosure is described and shown, it is obvious to a person skilled in the art that the present disclosure is not limited to the described embodiment and may be changed and modified in various forms without departing from the spirit and scope of the present disclosure. Accordingly, modifications or variations should not be individually understood in view of the technical spirit of the present disclosure, and it must be understood the modifications and the variations belong to the claims of the present disclosure

INDUSTRIAL APPLICABILITY

According to the flight simulation apparatus of the present disclosure, the first and second seats can be freely moved forward and rearward, can be positioned at various locations in the front-rear direction to facilitate pilot training for various types of aircraft, and can be stably supported, and it is possible to form a flight simulation apparatus with a stable structure. As the present disclosure overcomes the limitations of the related art in this respect, there can be a good chance of marketing and building a business of the applied devices as well as applications for the related technologies, and the present disclosure can be actually clearly carried out with great industrial availability.

What is claimed is:

1. A flight simulation apparatus in which first and second seats, in which a user is able to sit, are arranged in a left-right direction with one of the seats side-by-side to the other seat and in a front-rear direction with one of the seats behind the other seat, comprising:
    a base plate;
    a pair of first front and rear rails formed on the base plate so as to be parallel to each other;
    a pair of second front and rear rails that are formed on the base plate so as to be parallel to each other and are parallel to the first front and rear rails;
    a pair of first left and right rails configured to extend in the perpendicular direction to the first front and rear rails and coupled to the pair of first front and rear rails so as to slide thereon along the longitudinal direction of the first front and rear rails;
    a pair of second left and right rails configured to extend in the perpendicular direction to the second front and rear rails and coupled to the pair of second front and rear rails so as to slide thereon along the longitudinal direction of the second front and rear rails;
    at least two first sliders coupled to the first left and right rails so as to slide thereon along the longitudinal direction of the first left and right rails and configured to support the first seat;
    at least two second sliders coupled to the second left and right rails so as to slide thereon along the longitudinal direction of the second left and right rails and configured to support the second seat;
    a pair of first auxiliary rails that are parallel to the first left and right rails, is configured to cross the second front and rear rails, and is formed such that the first sliders are to slide thereon; and
    a pair of second auxiliary rails that are parallel to the second left and right rails, is configured to cross the first front and rear rails, and is formed such that the second sliders are to slide thereon,
    wherein the interval between the pair of first left and right rails is the same as that between the pair of first auxiliary rails, and the interval between the pair of second left and right rails is the same as that between the pair of second auxiliary rails.

2. The flight simulation apparatus of claim 1, wherein the pair of first sliders are located on the pair of first front and rear rails, and the pair of second sliders are located on the pair of second front and rear rails.

3. The flight simulation apparatus of claim 1, wherein first insertion holes are formed in the first front and rear rails along a longitudinal direction thereof,
    second insertion holes are repeatedly formed in the second front and rear rails along the longitudinal direction thereof, and
    the flight simulation apparatus further comprises: first block units that are coupled to the first left and right rails and are inserted into, or extracted from, the first insertion holes to prevent the first left and right rails from moving; and second block units that are coupled to the second left and right rails and are inserted into, or extracted from, the second insertion holes to prevent the second left and right rails from moving.

4. The flight simulation apparatus of claim 3, wherein each of the first block units comprises:
    a housing fixedly coupled to the first left and right rails;
    an insert that is configured to move upward and downward through a housing and has the lower end portion inserted into the first insertion hole; and a resilient object configured to resiliently support the insert in the direction in which the insert is inserted into the first insertion hole, wherein the insert has a stopper formed thereon and is extracted from the first insertion hole when the insert is rotated while being pulled in the opposite direction to the first insert hole.

5. The flight simulation apparatus of claim 3, wherein third insertion holes are formed in the first left and right rails along the longitudinal direction thereof, fourth insertion holes are repeatedly formed in the second left and right rails along the longitudinal direction thereof, each of the first sliders is coupled with a third block unit that is inserted into the third insertion hole to prevent the first slider from moving, and each of the second sliders is coupled with a fourth block unit that is inserted into the fourth insertion hole to prevent the second slider from moving.

6. The flight simulation apparatus of claim 1, wherein the first and second auxiliary rails are detachably coupled to the base plate.

7. The flight simulation apparatus of claim 1, wherein the first auxiliary rail and the second auxiliary rail are located on the base plate and the pair of first auxiliary rails and the pair of second auxiliary rails are rotatably coupled to the base plate, and each of the rotation axes of the first and second auxiliary rails comprises a vertical rotation axis and a horizontal rotation axis.

8. The flight simulation apparatus of claim 7, wherein the first and second auxiliary rails are configured to rotate about a rotation axes and are located between the first and second front and rear rails so as to be parallel thereto without interference.

* * * * *